Nov. 16, 1965 G. C. ROSE 3,218,587

CAVITY RESONATOR TUNING DEVICE WITH FIXED CAPACITOR MOVING ACROSS THE ELECTRIC AND MAGNETIC FIELDS THEREIN

Filed May 26, 1960

INVENTOR.
Gus C. Rose

BY Mueller & Aichele
Attys.

3,218,587

CAVITY RESONATOR TUNING DEVICE WITH FIXED CAPACITOR MOVING ACROSS THE ELECTRIC AND MAGNETIC FIELDS THEREIN

Gus C. Rose, Chicago, Ill., assignor to Motorola, Inc., Chicago, Ill., a corporatin of Illinois Filed May 26, 1960, Ser. No. 32,007
5 Claims. (Cl. 334—45)

This invention relates generally to electron discharge apparatus, and more particularly to a tuning device for ultra-high frequency electronic apparatus employing cavity resonators.

Tuned circuits in the form of resonant chambers or cavities may be associated with one or more elements of an electron discharge device or vacuum tube to provide tuning at microwave frequencies. Such cavities are a form of wave guide having conductive surfaces which act as the boundaries of an electric wave and which have the ability of directing the propagation of such a wave.

Resonant cavities may be tuned by changing the physical dimensions of the cavities, as by making one wall of the cavity movable so that the size of the cavity and its resonant frequency are varied. For example a simple short-circuiting bar or end cap may be used to determine the effective length of a cavity. However, when such a short-circuiting bar is positioned to cause the cavity to operate in the resonate condition, high currents may flow between the short-circuiting device and the adjacent portion of the conductive surfaces of the cavity. This high current condition introduces troublesome contact problems, especially when the shorting device must be movable along the guide to adjust its length over a range of values.

Other known methods of varying the frequency of a tuned cavity resonator may be unsuitable where a stable fixed frequency of operation is desired, since frequency stability requires that the cavity resonator be formed of rigid walls and that other special precautions be taken to maintain the grids or other electrodes at a fixed distance from one another. In such devices adjustable but complicated plungers or bellows have been provided which are introduced into the resonator to thereby reduce the volume of the enclosed resonator space an amount which adjusts the resonator frequency at or near the desired operation frequency. In addition, simple tuning screws have been provided in one of the wall portions which vary the capacitive reactance between the surfaces of the cavity resonator to obtain frequency variations. Such tuning screws, while mechanically simple, nevertheless are often inaccurate due to their coarse threading and unstable mounting. In fact, if any of the foregoing tuning devices are likely to wobble when subjected to vibrations in operation, undesirable shifts in frequency will result.

Accordingly it is an object of the present invention to provide an improved tuning device for use with a resonant cavity.

Another object is to extend the tuning range of cavity resonators used in conjunction with electron discharge devices while maintaining the size of the resonator within a restricted volume.

A further object of the invention is to provide an improved capacitive tuning device for a cavity resonator which is simple in construction and accurate, efficient and reliable under severe conditions of operation.

A feature of the invention is the provision of a capacitive assembly in which plates and dielectric portions thereof are kept constant while a portion of the assembly is movable in an electric field gradient within a hollow wave guide to thereby vary its resonant frequency, the movable portion being driven between two walls of the wave guide by a threaded shaft supported by both walls.

Another feature of the invention is the provision of a microwave cavity tuning device for use in a rectangular cavity resonator circuit which is connected to a concentrically constructed vacuum tube eletron discharge device and which includes a conductive block with insulation on each side thereof and a non-conductive lead screw for moving the block across the fields set up in the rectangular cavity by the vacuum tube to thereby tune the resonator.

In accordance with the present invention, a microwave cavity tuning device is provided which is particularly useful for tuning a rectangular type cavity resonator over a wide range of frequencies. A conductive block is threadably received on a non-conductive lead screw which is rigidly but rotatably mounted in spaced apart side walls of the cavity. The block may be of rectangular shape with opposite parallel surfaces at least one of which is spaced from the top or bottom wall of the cavity. When both parallel surfaces of the block are spaced from the top and bottom walls, each surface is covered with a dielectric material which fills the space between these surfaces and the walls of the cavity so that the block is insulated from and also rigidly supported in the cavity. An assembly having a fixed capacitance is thus provided a portion of which is movable through the variable electrical and magnetic fields within the cavity by rotation of the lead screw to provide a tuning adjustment which is easily accessible, of vernier quality and highly reliable in operation.

Figures 1, 2:
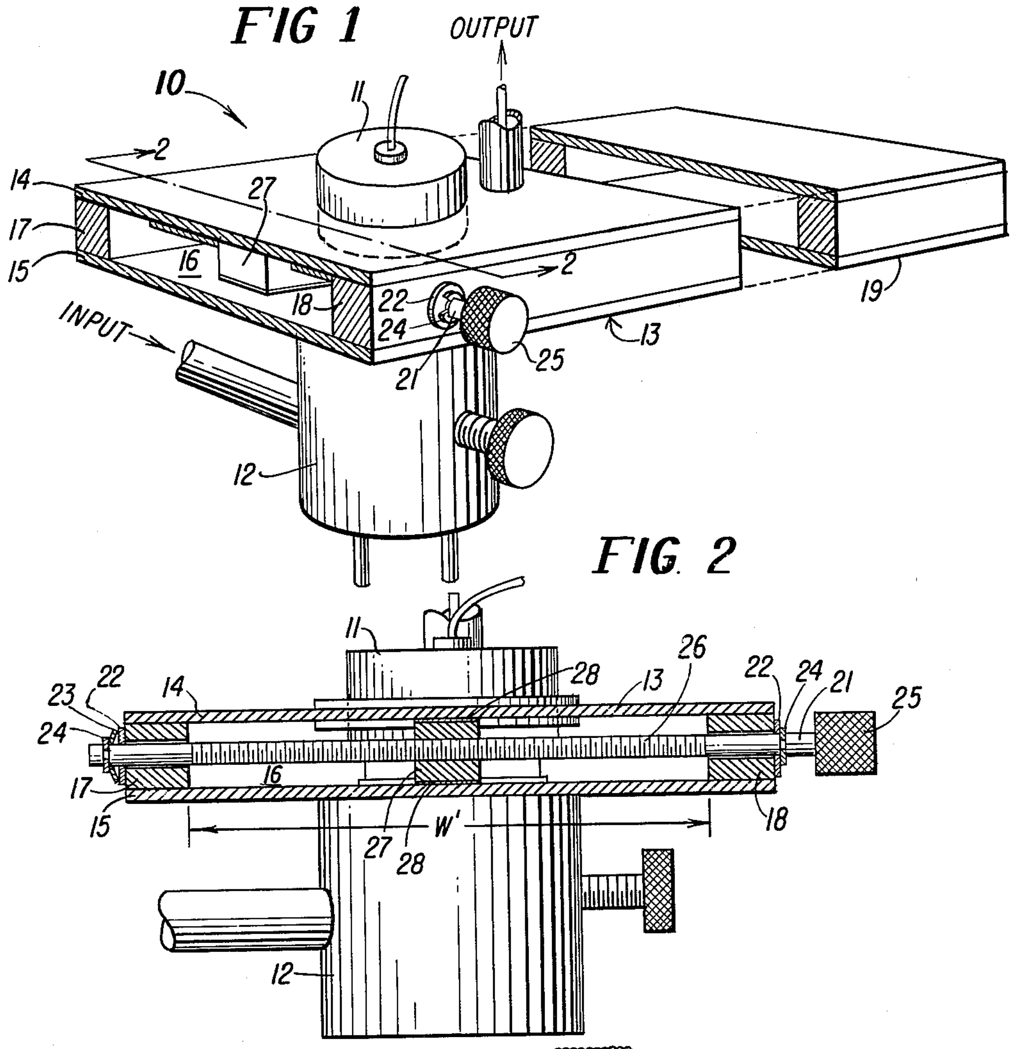
FIG. 1 is a fragmentary perspective view of a microwave triode power amplifier embodying the tuning device of the invention.
FIG. 2 is an enlarged cross sectional view taken on the line 2—2 of FIG. 1.

Referring in more detail to the accompanying drawing, FIG. 1 shows a triode power amplifier 10 designed for 960 megacycle operation and embodying the capacitive tuning device of the invention. Amplifier 10 includes an electron discharge device or vacuum tube 11 of concentrical construction wherein the vacuum tube elements are brought out of the vacuum tube to circular or cylindrical terminals spaced apart and arranged on a common axis. Tube 11 may be an Amperex TBL 2/400 vacuum tube, which is a ceramic triode of the above concentric or radial type well known in the art.

The cavity resonator structure provides tuned input and output cavity resonator circuits for the vacuum tube discharge device 11. A hollow input wave guide 12 of coaxial construction is vertically disposed beneath and connected with a horizontal, rectangularly shaped output wave guide 13. Vacuum tube 11 is axially disposed in wave guide 12 and extends upward through the center of wave guide 13. The tube 11 is seated in and extends through registered apertures provided in a pair of spaced, parallel top and bottom walls 14 and 15 respectively of output wave guide 13. Walls 14 and 15 may be formed from brass plates having center holes to accommodate the grid and anode rings of tube 11. An output cavity 16 is thus formed between the bottom or grid wall 15 and the top or anode wall 14, with the side walls of cavity 16 being formed by a pair of spaced, parallel conducting bars 17 and 18 disposed between the top and bottom walls. Output cavity 16 is of the extended wave guide type with sections extending horizontally from the tube 11, as indicated by the wave guide extension section 19. The opposite extension is not shown, it being removed for purposes of more clearly illustrating the location of the tuning device of the invention.

In FIGS. 1 and 2, the mechanical features of a tuning device in accordance with the invention are shown in an embodiment constructed for operation in the rectangular type cavity 13. A non-conductive shaft 21 is rotatably carried in cylindrical holes provided through side walls 17 and 18. Shaft 21 is held in place by a combination of flat washers 22, a spring washer 23 and retaining rings 24, as shown in FIG. 2. One end of shaft 21 is extended sufficiently beyond wall 18 to receive a tuning knob 25. With both ends thus well supported for rotation in the side walls, shaft 21 is axially fixed in both directions. Shaft 21 is made of an insulating material, preferably a plastic such as polytetraflouroethylene, for example, that sold under the trademark "Teflon," which has low dielectric-loss properties at high radio frequencies, as well as being slippery and wear resistant. The portion of shaft 21 between the inside surfaces of walls 17 and 18 is provided with suitable threads 26 so that the shaft functions as a lead screw for a metallic block 27 threadably received thereon.

Block 27 is generally rectangular in shape and may be constructed of magnetic or non-magnetic electrically conductive material, but preferably it is made of brass. An internally threaded center hole is formed therethrough for receiving shaft 21. The top and bottom surfaces of block 27 are disposed parallel to one another and are spaced according to the thickness of the block a given distance from the inside surfaces of walls 14 and 16 respectively. A pair of identical dielectric members 28, such as two thin sheets of plastic, preferably polytetrafluoroethylene, are cut to fit the shape of block 26, and are suitably mounted on the top and bottom surfaces thereof to completely fill the space between block 27 and walls 14 and 16. Thus, a sturdy yet simple structure is formed for tuning cavity 16, the insulated block 27 being driven across the cavity in a close sliding fit between the top and bottom walls thereof when knob 23 is rotated.

The grid-plate cavity 16 is designed to resonate with the grid-to-plate capacitance of tube 11. For example, in the particular embodiment described, the grid-to-plate capacitance of tube 11 resonates with the inductance reflected by a section of transmission line which is shorted at one end by wall 17. In order to accommodate grid-to-plate capacitance of the aforementioned tube without unduly decreasing the length of the line, a second section shorted by wall 18 is added in parallel with the first, the second section being equal in length to the first so that each resonates with half the grid-to-plate capacitance of the tube. Thus the two transmission lines when joined form cavity 16, the total line length thereof being designated W′ in FIG. 2. For an operating frequency of 960 megacycles, this line length W′ was found to be 2.33 inches. The top and bottom walls 14 and 15 of cavity 16 may be considered a parallel-plate transmission line in which the plates are assumed to have negligible thickness compared to the dimensions in the plane of these plates. In the disclosed embodiment, these plates were spaced one half inch apart, and each of the insulating spacer members 28 on conducting block 27 was .01 inch in thickness.

In order to prevent radiation of power from the sides of the lines (the open ends of cavity 16) these sides are extended, as shown on one side by section 19, so that the overall longitudinal dimension of the cavity is at least four times the dimension W′. In the particular cavity described above, a resonant condition is provided at the high end of the frequency range and the tuning device is operable to reduce the resonant frequency as desired to cover the band.

In operation, the combination of the metallic block 27 and insulating spacers 28 with the respective top and bottom metallic walls 14 and 15 of cavity 13 form a capacitive assembly having a fixed capacitance. This capacitor assembly is in effect two capacitors connected in series, as shown in the equivalent electrical schematic diagram of FIG. 3. The capacitance of the assembly is in shunt with the lumped grid-to-plate capacitance $C_{gp}$ of tube 11. The path of travel of block 27 is transverse to the longitudinal dimension of the wave guide, so that the block may pass closely adjacent to the upper electrode portions of tube 11.

Figures 3, 4:
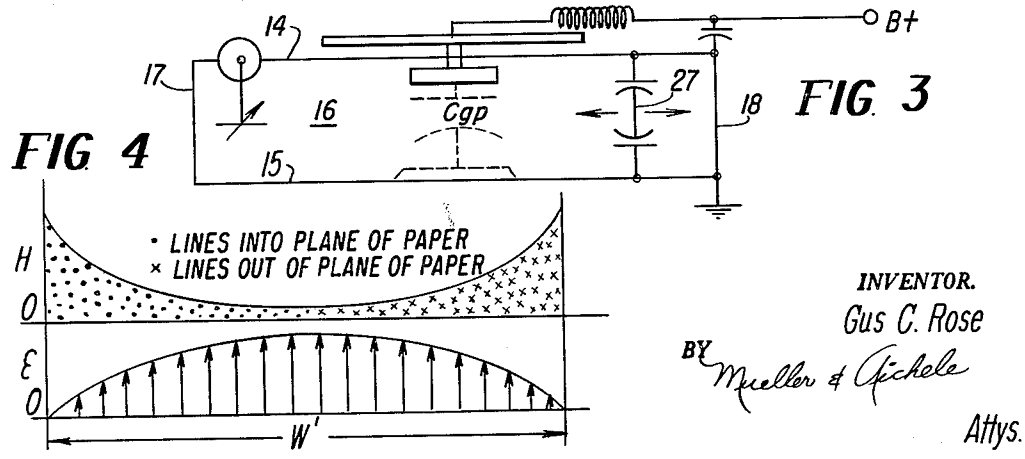
FIG. 3 is a schematic diagram illustrating the equivalent electrical circuit provided by the mechanical structure of the tuning device.
FIG. 4 is a graphic representation of the respective magnetic and electrical field distributions encountered within the wave guide along the section line 2—2 of FIG. 1.

In a wave guide propagating the $TE_{1,0}$ mode, the magnetic and electric field distributions across the wave guide in the direction W′ may be graphically represented as shown in the upper and lower graphs respectively of FIG. 4. Tuning is accomplished by taking advantage of these field configurations within cavity 16. The magnetic field intensity H is greatest at the sides of the wave guide and the electric field E has a maximum at the center. The distribution is normally sinusoidal in a conventional wave guide but in the described embodiment it is distorted because of the presence of the lumped capacitance $C_{gp}$. If a metallic block is inserted at one of the side walls 17, 18 of cavity 16, it shorts the magnetic field, causing an increase in resonant frequency which is similar to the result obtained by reducing the wave guide dimension W′. However, when capacitance is introduced in cavity 16 adjacent either of sidewalls 17 or 18, it has no effect on the electrical width of the wave guide since the capacitor is in an area of zero electric field. As the capacitor block 27 is advanced toward the center of cavity 16 by rotation of knob 25, it moves into an area of progressively stronger electric field and progressively weaker magnetic field. Thus the effect of the capacitance in parallel with the distributed capacitance of the guide becomes more pronounced, while the effect of shorting the magnetic field becomes less pronounced. The result is that the resonant frequency of cavity 16 becomes lower as the capacitance block 27 is advanced toward the center of the cavity, with the lowest frequency being obtained when the tuning block is in the center of the cavity. Using the tuning device of the invention in the above described cavity, a tuning range of over 100 megacycles is obtained at frequencies of the order of 900 megacycles. If desired, this range can be limited by increasing the thickness of the dielectric members 28 on each side of the brass block 26.

It will now be understood that, in addition to the mechanical simplicity and ruggedness of the tuning device, a tuning adjustment is provided which is easily accessible and of vernier quality due to the distance available for travel of the block across the field gradients. The capacitive block and lead screw are easily constructed and, because of the wide range of tuning which is provided, the cavity may be constructed with less critical tolerances, thereby contributing to the economy of the resonator structure.

I claim:

1. A tunable cavity resonator circuit, including in combination, a hollow structure having substantially parallel conductive walls spaced apart by a pair of side walls, said conductive walls and said side walls together defining a rectangular wave propagating space of fixed dimensions, means providing electro-magnetic waves coupled to said structure and applying said waves to said waves propagating space, said conductive walls forming a boundary for said electro-magnetic waves whereby magnetic and electric fields are developed in said hollow wave propagating space and the intensity of the magnetic field decreases from said walls to the center thereof and the intensity of the electric field increases from said side walls to the center thereof, a conductive member disposed within said propagating space and having a pair of opposite surfaces individually adjacent to and spaced apart from said conductive walls of said hollow structure, each of said surfaces having dielectric means thereon adapted to slide against one of said conductive walls to provide a fixed capacitance structure therebetween, and lead screw means rotatably supported by said side walls for transversely moving said fixed capacitance structure across said magnetic and electric fields to effect tuning of said resonator.

2. A tunable cavity resonator circuit of fixed dimensions, including in combination, a hollow structure having conductive walls defining a wave propagating space, means providing electromagnetic waves coupled to said structure and applying said waves to said wave propagating space whereby magnetic and electric fields are developed therein and the intensity of the magnetic field decreases from one point therein to another therein and the intensity of the electric field increases from said one point to said other point therein, a non-conductive shaft rotatably supported by said hollow structure and having a threaded portion extending between said points of said propagating space, a conductive body threadably received on said threaded portion of said shaft within said propagating space, and having a pair of opposite surfaces individually adjacent to and spaced from opposite walls of said hollow structure, each of said opposite surfaces of said conductive body having dielectric means thereof adapted to slide against said opposite wall, to provide a fixed capacitance structure therebetween and to prevent rotation of said conductive body, whereby rotation of said shaft causes said fixed capacitance structure to move along said opposite walls and across said magnetic and electric fields to effect tuning of said resonator.

3. In a high frequency system, an electron discharge device for providing electro-magnetic waves and having an anode and a control grid, a cavity resonator wave guide for said device including a pair of parallel conductive surfaces spaced a given distance apart and having registered apertures therein to receive said electron discharge device, the first of said conductive surfaces being coupled to said anode, and the second of said conductive surfaces being coupled to said grid, a pair of spaced apart side wall surfaces which together with said conductive surfaces define a resonant output cavity, said device applying said waves to said resonant output cavity whereby magnetic and electric fields of the $TE_{1,0}$ mode are developed therein, a metal block having a thickness less than the spacing between said first and second conductive surfaces, said block having a pair of dielectric members affixed thereto for sliding contact against said first and second conductive surfaces respectively, and to provide in cooperation with said block and said surfaces a fixed capacitance assembly, and means for adjustably driving said fixed capacitance assembly between said side walls and across said magnetic and electric fields in a path near said anode and grid for tuning said electron discharge device.

4. In a high frequency system a vacuum tube for providing electro-magnetic waves and having an anode and control grid, a cavity resonator wave guide of constant volume for said tube including a pair of parallel metallic plates spaced a given distance apart and having registered apertures therein to receive said tube, the first of said plates being coupled to said anode and the second of said plates being coupled to said grid, a pair of spaced apart metallic side walls, which together with said plate define a resonant output cavity, said tube applying said electromagnetic waves to said resonant output cavity whereby magnetic and electric fields of the $TE_{1,0}$ mode are developed therein, a shaft made of polytetrafluoroethylene and being rotatably supported by each of said side walls and having a threaded portion extending between said side walls, a brass block threadably received on said threaded portion of said shaft between said first and second plates, said block having a pair of members made of polytetrafluoroethylene which are fixed to surfaces thereof opposite said first and second plates, so that said block provides in cooperation with said members and said plates and assembly having a fixed capacitance in parallel with the grid to plate capacitance of said tube, said shaft extending through one of said side walls to receive a control knob for rotating said shaft to thereby drive said fixed capacitance assembly between said side walls, and across said magnetic and electric fields in a path near said anode and grid for tuning said output cavity.

5. A tunable cavity resonator, including in combination, a hollow structure having substantially parallel conductive walls spaced apart by a pair of side walls, said conductive walls and said side walls together defining a rectangular wave propagating space of fixed dimensions, means providing electro-magnetic waves coupled to said structure and applying said waves to said wave propagating space, said conductive walls forming a boundary for said electro-magnetic waves whereby magnetic and electric fields are developed in said hollow wave propagating space and the intensity of the magnetic field decreases from said walls to the center thereof and the intensity of the electric field increases from said side walls to the center thereof, a conductive member disposed within said propagating space and having a pair of opposite surfaces individually adjacent to and spaced a fixed distance from said conductive walls of said hollow structure, dielectric means between each of said surfaces and the adjacent one of said conductive walls to provide a fixed capacitance structure, and means for transversely moving said conductive member between said side walls to effectively move said fixed capacitance structure across said magnetic and electric fields to effect tuning of said resonator.

References Cited by the Examiner

UNITED STATES PATENTS

| | | | |
|---|---|---|---|
| 2,411,858 | 12/1946 | Harvey | 334—41 |
| 2,431,103 | 11/1947 | Bradley et al. | 315—5.21 X |
| 2,442,671 | 6/1948 | Tompkins | 315—5.21 X |
| 2,458,650 | 1/1949 | Schreiner et al. | |
| 2,484,643 | 10/1949 | Peterson. | |
| 2,492,155 | 12/1949 | Kandoian. | |
| 2,515,225 | 7/1950 | Holet et al. | 325—19 |
| 2,720,628 | 10/1955 | Kumpfer | 315—39.61 X |
| 2,795,699 | 6/1957 | Balash et al. | 334—42 |
| 2,853,647 | 9/1958 | Litton | 315—5.47 |
| 2,966,635 | 12/1960 | Schachter | 334—41 X |

GEORGE N. WESTBY, *Primary Examiner.*

RELPH G. NILSON, ARTHUR GAUSS, DAVID J. GALVIN, ROBERT SEGAL, *Examiners.*